United States Patent
Chen (10) Patent No.: US 11,417,142 B2
(45) Date of Patent: Aug. 16, 2022

(54) OPTICAL FINGERPRINT SENSING DEVICE AND OPTICAL FINGERPRINT SENSING METHOD

(71) Applicant: NOVATEK Microelectronics Corp., Hsinchu (TW)

(72) Inventor: Chi-Ting Chen, Hsinchu (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 17/324,116

(22) Filed: May 19, 2021

(65) Prior Publication Data

US 2021/0365660 A1    Nov. 25, 2021

Related U.S. Application Data

(60) Provisional application No. 63/027,971, filed on May 21, 2020.

(51) Int. Cl.
G06V 40/13    (2022.01)
(52) U.S. Cl.
CPC .................................. G06V 40/1318 (2022.01)
(58) Field of Classification Search
CPC ........................................... G06V 40/12–1394
See application file for complete search history.

(56) References Cited

U.S. PATENT DOCUMENTS

| | | | | |
|---|---|---|---|---|
| 10,740,917 B2 * | 8/2020 | Ge | ........................ | G06V 10/757 |
| 2019/0012506 A1 * | 1/2019 | Fang | .................. | G06V 40/1306 |
| 2021/0365660 A1 * | 11/2021 | Chen | .................. | G06V 40/1306 |

FOREIGN PATENT DOCUMENTS

| | | | | |
|---|---|---|---|---|
| CN | 109711391 A | 5/2019 | | |
| CN | 109870845 A | 6/2019 | | |
| CN | 110276330 A | 9/2019 | | |
| CN | 110763336 A | 2/2020 | | |
| JP | 2018074268 A | * | 5/2018 | ............. H04N 5/357 |
| TW | 201937190 A | 9/2019 | | |

\* cited by examiner

*Primary Examiner* — Patrick F Marinelli
(74) *Attorney, Agent, or Firm* — CKC & Partners Co., LLC (57) ABSTRACT

An optical fingerprint sensing device includes optical sensing pixels, optical blocked pixels and a readout circuit. Each of the optical sensing pixels includes a first photodevice for sensing an illumination through an optical path. The optical sensing pixels are configured to generate sensing signals. Each of the optical blocked pixels includes a second photodevice blocked from the illumination. The optical sensing pixels are configured to generate a plurality of tracking signals. The readout circuit is configured to generate output signals according to differences between the sensing signals and the tracking signals.

18 Claims, 10 Drawing Sheets

OPTICAL FINGERPRINT SENSING DEVICE AND OPTICAL FINGERPRINT SENSING METHOD

RELATED APPLICATIONS

The present application claims priority to U.S. Provisional Patent Application No. 63/027,971, filed May 21, 2020, which is incorporated by reference herein in its entirety.

BACKGROUND

Technical Field

The present disclosure relates to an optical fingerprint sensing module and a display device with optical fingerprint detection.

Description of Related Art

Accompanying with the development of portable devices such as smart phones and tablet computers, techniques of individual identification are highly demanded. Among individual identification techniques, the fingerprint identification technique is thought to be promising from the standpoints of cost, size and identification accuracy. In conventional smart phones, the fingerprint identification modules are equipped in the cell phones at a region out of the display panel.

Recently, some smart phones equipped with OLED panel integrate fingerprint identification sensors into the OLED panels in order to minimalize the frame size of the smart phones. However, these fingerprint identification sensors are relatively sensitive about environmental conditions, such as temperature variations. When the environmental conditions change (e.g., heats accumulated in the OLED panel), sensing data generated by the fingerprint identification sensors might be distorted.

SUMMARY

One aspect of the present disclosure is to provide an optical fingerprint sensing device, which includes optical sensing pixels, optical blocked pixels and a readout circuit. Each of the optical sensing pixels includes a first photodevice for sensing an illumination through an optical path. The optical sensing pixels are configured to generate sensing signals. Each of the optical blocked pixels includes a second photodevice blocked from the illumination. The optical sensing pixels are configured to generate a plurality of tracking signals. The readout circuit is configured to generate output signals according to differences between the sensing signals and the tracking signals.

Another aspect of the present disclosure is to provide an optical fingerprint sensing method, which include following steps. Sensing signals are generated by optical sensing pixels. Each of the optical sensing pixels includes a first photodevice for sensing an illumination through an optical path. Tracking signals are generated by optical blocked pixels. Each of the optical blocked pixels includes a second photodevice blocked from the illumination. Output signals are generated according to differences between the sensing signals and the tracking signals by a differential amplifier.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

According to one aspect of the present disclosure, an optical fingerprint sensing device is provided. The optical fingerprint sensing device is capable of detecting or sensing a fingerprint of a user's finger. In various embodiments, the optical fingerprint sensing device detects the illumination reflected by the finger, and so as to detect the fingerprint.

Figure 1:
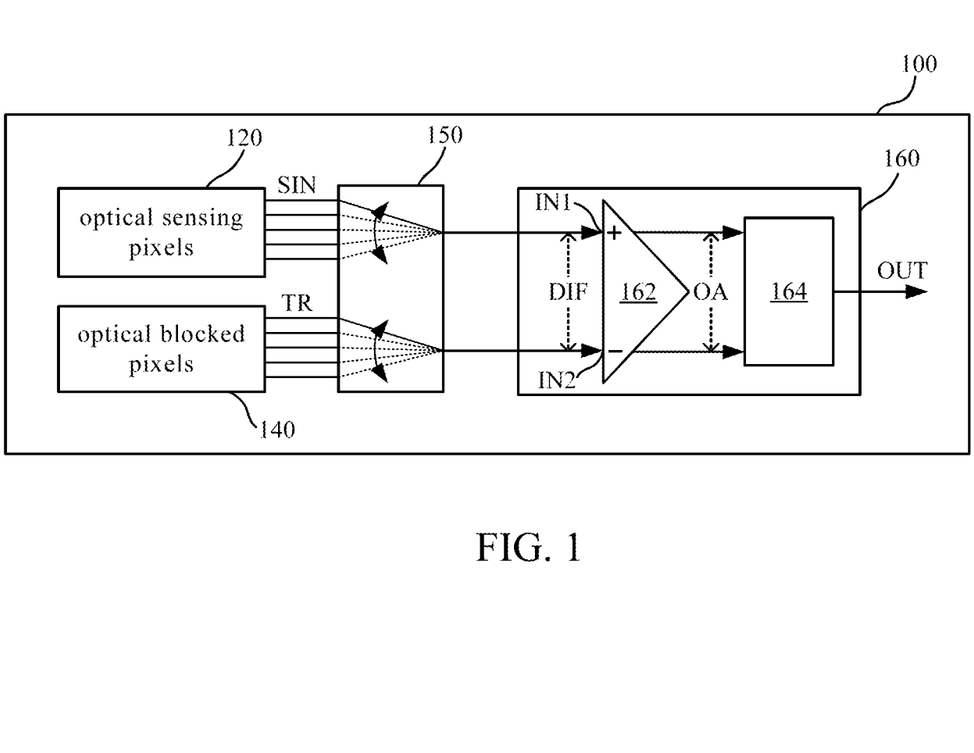
FIG. 1 is a schematic diagram schematically illustrating an optical fingerprint sensing device according to some embodiments of the present disclosure.

FIG. 1 is a schematic diagram schematically illustrating an optical fingerprint sensing device 100 according to some embodiments of the present disclosure. As shown in FIG. 1, the optical fingerprint sensing device 100 includes optical sensing pixels 120, optical blocked pixels 140, a switching circuit 150 and a readout circuit 160. The optical sensing pixels 120 are configured to generate sensing signals SIN, which are utilized to determine an illumination strength distribution for detecting a fingerprint. The optical blocked pixels 140 are configured to generate tracking signals, which are utilized to track an environmental condition (e.g., temperature distortion, signal distortion) related to the optical sensing pixels 120. The switching circuit 150 is coupled between the optical sensing pixels 120, the optical blocked pixels 140 and the readout circuit 160. The readout circuit 160 is configured to generate output signals OUT according to differences DIF between the sensing signals SIN and the tracking signals TR.

As shown in FIG. 1, the readout circuit 160 in some embodiments includes a differential amplifier 162 and an analog-to-digital converter (ADC) 164. The differential amplifier 162 includes a first input terminal IN1 and a second input terminal IN2. The first input terminal IN1 is configured to receive one of the sensing signals SIN. The second input terminal IN2 is configured to receive one of the tracking signals TR.

In order to generate one of the output signals OUT corresponding to one of the optical sensing pixels 120, the switching circuit 150 is configured to select one sensing signal SIN generated by one of the optical sensing pixels 120 at a time and transmit the selected sensing signal SIN to the first input terminal IN1 of the differential amplifier 162. In the meantime, the switching circuit 150 is also configured to select one corresponding tracking signal TR generated by a corresponding one of the optical blocked pixel 140 and transmit the selected tracking signal TR to the second input terminal IN2 of the differential amplifier 162. The differential amplifier 162 is configured to generate an analog output signal OA according to the difference DIF between the selected sensing signal SIN and the selected tracking signal TR. The analog-to-digital converter 164 is configured to convert the analog output signal OA into the output signal OUT. In some embodiments, the optical fingerprint sensing device 100 may repeatedly execute aforesaid process to generate the output signals OUT one-by-one corresponding to each of the optical sensing pixels 120.

Figure 2:
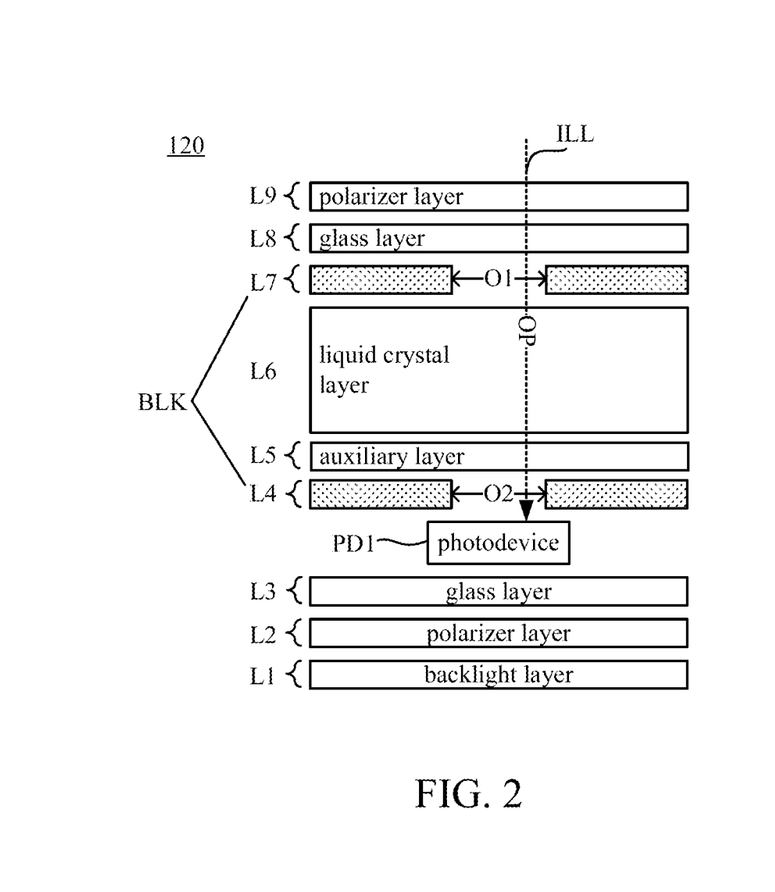
FIG. 2 is a sectional view diagram illustrating a layer structure of one optical sensing pixel in FIG. 1 in some embodiments of this disclosure.
Figure 3:
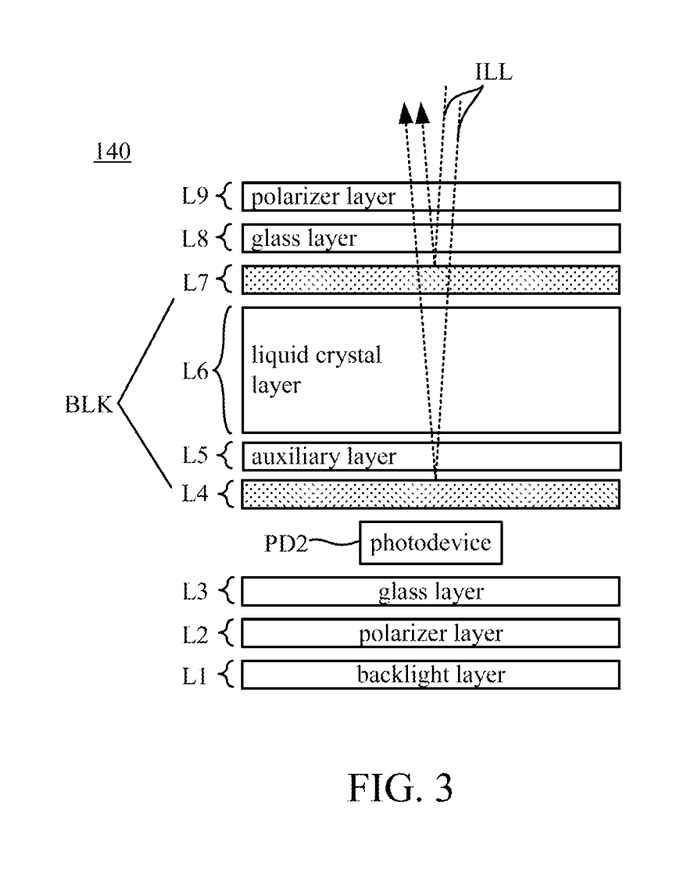
FIG. 3 is a sectional view diagram illustrating a layer structure of one optical blocked pixel in FIG. 1 in some embodiments of this disclosure.

Reference is further made to FIG. 2 and FIG. 3. FIG. 2 is a sectional view diagram illustrating a layer structure of one optical sensing pixel 120 in FIG. 1 in some embodiments of this disclosure. FIG. 3 is a sectional view diagram illustrating a layer structure of one optical blocked pixel 140 in FIG. 1 in some embodiments of this disclosure.

As shown in FIG. 2, each of the optical sensing pixels 120 includes a first photodevice PD1. The first photodevice PD1 is configured for sensing an illumination ILL through an optical path OP. In some embodiments, the illumination ILL can be a reflection light from a fingerprint contacted on the optical sensing pixel 120. According to a strength level of the illumination ILL received by the first photodevice PD1, the optical sensing pixel 120 is able to generate the sensing signal SIN. For example, when the strength level of the illumination ILL is higher, a current amplitude or a voltage level of the sensing signal SIN is higher. In some embodiments, the first photodevice PD1 includes a photodiode for sensing the illumination ILL.

It is noticed that, ideally, the sensing signal SIN is substantially affected by the strength level of the illumination ILL. In practices, the sensing signal SIN generated by the optical sensing pixel 120 is also affected by an environmental condition (e.g., a temperature variation) around the optical sensing pixel 120. For example, when the environmental temperature around the optical sensing pixel 120 is raised (e.g., when a large current is generated by the optical sensing pixel 120 or passing around the optical sensing pixel 120), the sensing signal SIN will be distorted.

As shown in FIG. 2, in some embodiments, the optical sensing pixel 120 can be implemented in a structure with multiple layers, which include a backlight layer L1, a polarizer layer L2, a glass layer L3, the first photodevice PD1, a shading layer L4, an auxiliary layer L5, a liquid crystal layer L6, a color filter layer L7, another glass layer L8 and another polarizer layer L9. The layer structure of the optical sensing pixel 120 shown in FIG. 2 is demonstrated as an example, and the optical sensing pixel 120 in this disclosure is not limited to the same layers with this specific order. As shown in FIG. 2, the optical sensing pixel 120 includes an optical shielding component BLK, which includes the color filter layer L7 and the shading layer L4. The illumination ILL passes through at least one opening (e.g., O1 and O2) on the optical shielding component BLK to the first photodevice PD1. In some embodiments, the shading layer L4 can be implemented by a metal layer.

In the optical sensing pixel 120 shown in FIG. 2, the color filter layer L7 is disposed above the first photodevice PD1 and a first opening O1 is formed on the color filter layer L7 along the optical path OP. The shading layer L4 is also disposed above the first photodevice, and a second opening O2 is formed on the shading layer L4 along the optical path OP. The illumination ILL passes through the first opening O1 of the color filter layer L7 and the second opening O2 of the shading layer L4 to the first photodevice PD1, such that the first photodevice PD1 is sensible to the illumination ILL from a top surface of the optical sensing pixel 120.

On the other hand, as shown in FIG. 3, each of the optical blocked pixels 140 includes a second photodevice PD2. The second photodevice PD2 is blocked from the illumination ILL. In other words, a signal generated by the second photodevice PD2 is not affected by the illumination ILL, and the signal generated by the second photodevice PD2 is affected by an environmental condition (e.g., a temperature variation) around the optical blocked pixel 140. According to the environmental condition, the optical blocked pixel 140 is able to generate the tracking signal TR. For example, when the environmental temperature is higher, a current amplitude or a voltage level of the tracking signal TR is lower. In some embodiments, the second photodevice PD2 includes a photodiode, which is utilized as a dummy photodiode for tracking the environmental condition.

As shown in FIG. 3, in some embodiments, the optical blocked pixel 140 can be implemented in a structure with multiple layers, which include a backlight layer L1, a polarizer layer L2, a glass layer L3, the second photodevice PD2, a shading layer L4, an auxiliary layer L5, a liquid crystal layer L6, a color filter layer L7, another glass layer L8 and another polarizer layer L9. The layer structure of the optical blocked pixel 140 shown in FIG. 3 is demonstrated as an example, and the optical blocked pixels 140 in this disclosure is not limited to the same layers with this specific order. As shown in FIG. 3, the optical blocked pixel 140 includes an optical shielding component BLK, which includes the color filter layer L7 and the shading layer L4. The illumination ILL is blocked by the optical shielding component BLK (i.e., the color filter layer L7 and the shading layer L4) from the second photodevice PD2.

The structure of the optical blocked pixel 140 in FIG. 3 is similar to the structure of the optical sensing pixel 120 shown in FIG. 2. In some embodiments as shown in FIG. 2 and FIG. 3, the difference between the optical blocked pixel 140 and the optical sensing pixel 120 is that there is no opening formed on the optical shielding component BLK in the optical blocked pixel 140.

Figure 4A:
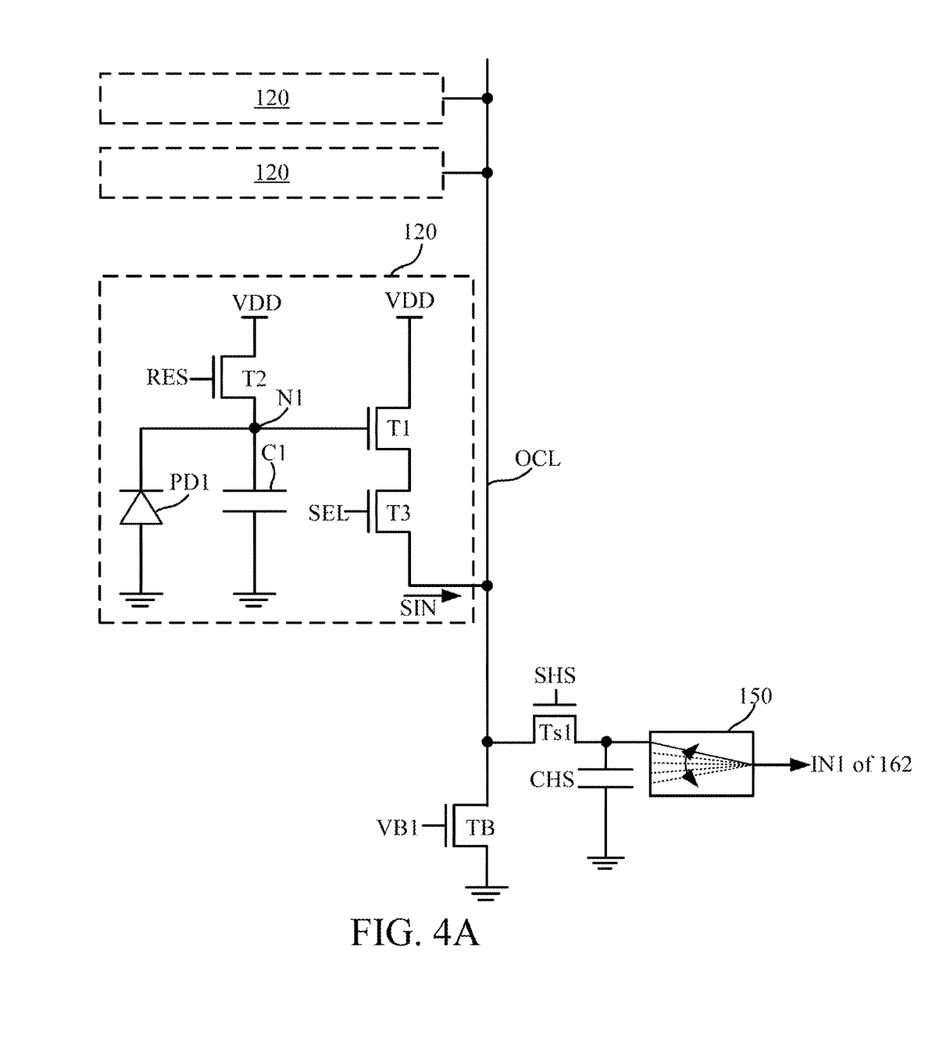
FIG. 4A is a schematic diagram illustrating a circuit structure of the optical sensing pixels in FIG. 1 in an embodiment of the disclosure.

Reference is further made to FIG. 4A, which is a schematic diagram illustrating a circuit structure of the optical sensing pixels 120 in FIG. 1 in an embodiment of the disclosure. As shown in FIG. 4A, each of the optical sensing pixels 120 include one first photodevice PD1, three transistors (a first transistor T1, a second transistor T2 and a third transistor T3) and one capacitor C1. In other words, the optical sensing pixels 120 shown in FIG. 4A is a circuit structure with 3T1C.

A gate of the first transistor T1 is coupled with the first photodevice PD1. Two source/drain terminals of the first transistor T1 are coupled to a system voltage level VDD and the third transistor T3. A gate of the second transistor T2 receives a reset signal RES. Two source/drain terminals of the second transistor T2 are coupled to the system voltage level VDD and the gate of the first transistor T1. A gate of the second transistor T3 receives a selection signal SEL. Two source/drain terminals of the third transistor T3 is coupled between the first transistor T1 and an output column line OCL. One terminal of the capacitor C1 is coupled with the gate of the source follower transistor. The capacitor C1 can be formed by a floating diffusion (FD) layer. According to the strength level of the illumination ILL received by the first photodevice PD1, a voltage level on the node N1 is charged (and kept by the capacitor C1). When the third transistor T3 is enabled by the selection signal SEL, the sensing signal SIN is generated by the first transistor T1 driven by the voltage level on the node N1. In some embodiments, another transistor TB driven by a bias control signal VB1 is configured to provide a bias voltage to the sensing signal SIN. The sensing signal SIN is transmitted to the output column line OCL and kept in another capacitor CHS when a transistor Ts1 is enabled by a control signal SHS. When the selection circuit 150 selects this output column line OCL, the sensing signal SIN is transmitted to the first input terminal IN1 of the differential amplifier 162 (referring to FIG. 1). In some embodiments, the sensing signal SIN generated by the optical sensing pixel 120 is determined according to at least two factors, which include an optical sensing factor about the illumination ILL (referring to FIG. 2A) and an environmental factor about the environmental condition, because the environmental factor may also affect the voltage level on the node N1 or a current passing through the first transistor T1 besides the illumination ILL.

Figure 4B:
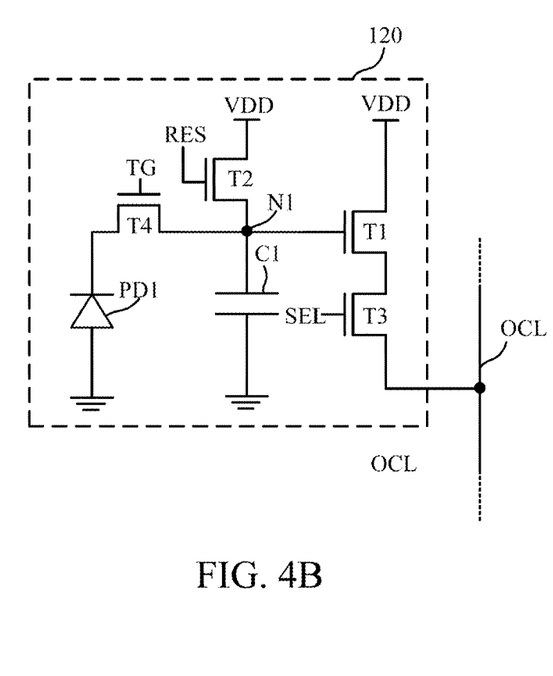
FIG. 4B is a schematic diagram illustrating another circuit structure of the optical sensing pixels in FIG. 1 in another embodiment of the disclosure.

Reference is further made to FIG. 4B, which is a schematic diagram illustrating another circuit structure of the optical sensing pixels 120 in FIG. 1 in another embodiment of the disclosure. As shown in FIG. 4B, each of the optical sensing pixels 120 include one first photodevice PD1, four transistors (a first transistor T1, a second transistor T2, a third transistor T3 and a fourth transistor T4) and one capacitor C1. In other words, the optical sensing pixels 120 shown in FIG. 4B is a circuit structure with 4T1C. Compared to the embodiment shown in FIG. 4A, the optical sensing pixels 120 shown in FIG. 4B further includes the fourth transistor T4 coupled between the first photodevice PD1 and the node N1. The fourth transistor T4 is controlled by a gate transfer control signal TG. Aforesaid 3T1C structure shown in FIG. 4A and the 4T1C structure shown in FIG. 4B are demonstrational examples to implement the optical sensing pixels 120, but the disclosure is not limited thereto.

Figure 5A:
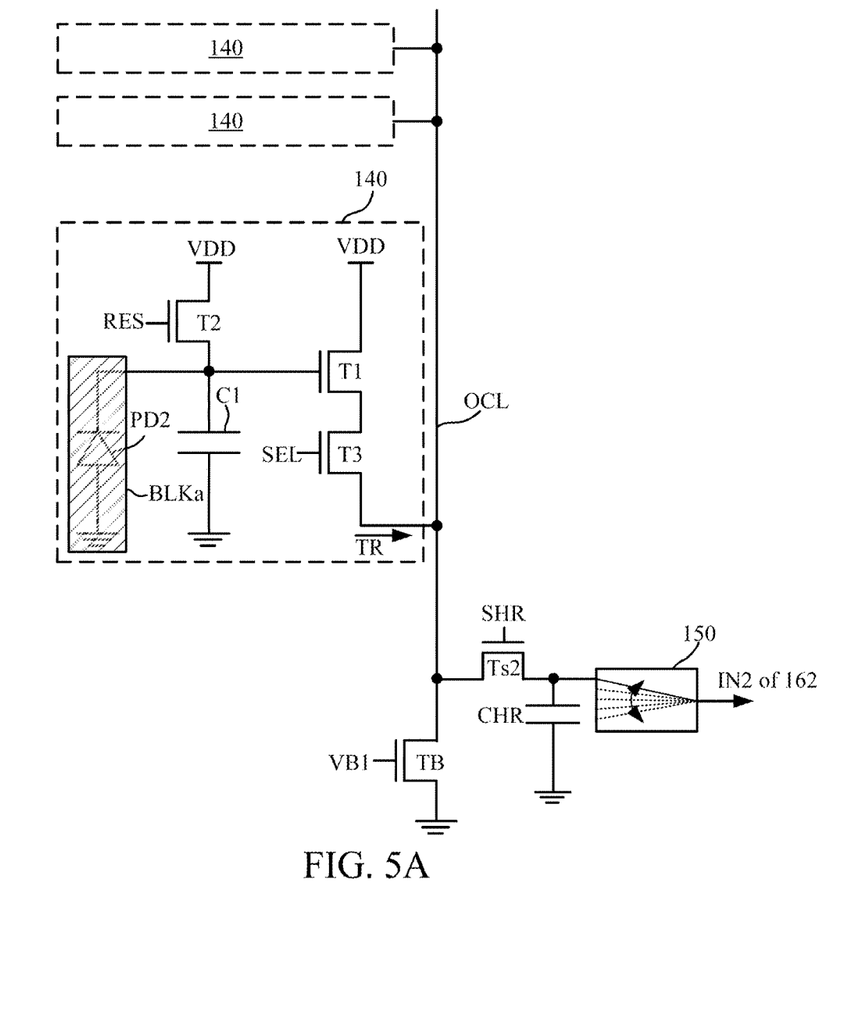
FIG. 5A is a schematic diagram illustrating a circuit structure of the optical blocked pixels in FIG. 1 in an embodiment of the disclosure.

Reference is further made to FIG. 5A, which is a schematic diagram illustrating a circuit structure of the optical blocked pixels 140 in FIG. 1 in an embodiment of the disclosure. As shown in FIG. 5A, each of the optical blocked pixels 140 include one second photodevice PD2, three transistors (a first transistor T1, a second transistor T2 and a third transistor T3) and one capacitor C1. In other words, the optical blocked pixel 140 shown in FIG. 5A is a circuit structure with 3T1C.

The circuit structure of the optical blocked pixel 140 in FIG. 5A is similar to the circuit structure of the optical sensing pixels 120 shown in FIG. 4A. The functions and behaviors about the 3T1C structure are similar to aforesaid embodiments about the optical sensing pixels 120. The optical blocked pixel 140 is configured to generate a tracking signal TR. The tracking signal TR is transmitted to the output column line OCL and kept in another capacitor CHR when a transistor Ts2 is enabled by a control signal SHR. When the selection circuit 150 selects this output column line OCL, the tracking signal TR is transmitted to the second input terminal IN2 of the differential amplifier 162 (referring to FIG. 1).

It is noticed that the optical blocked pixel 140 shown in FIG. 5A further includes the optical shielding component BLKa, which is disposed to cover a region above the second photodevice PD2. The optical shielding component BLKa is configured to block the illumination away from the second photodevice PD2. In this case, the tracking signal TR is determined according to an environmental factor about the environmental condition and the tracking signal TR is not affected by an optical sensing factor about the illumination. Therefore, in some embodiments, the tracking signal TR can be utilized to track the environmental condition around the optical blocked pixel 140.

Figure 5B:
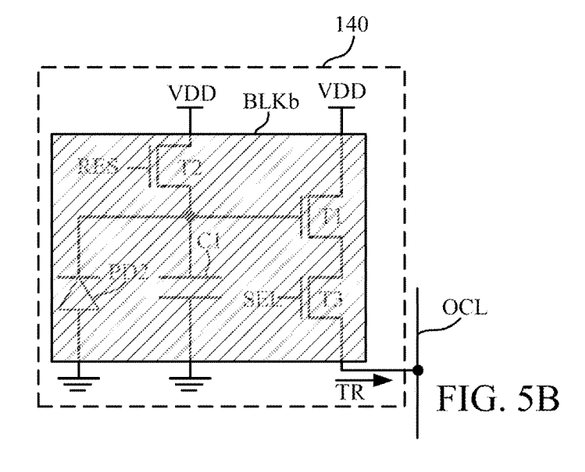
FIG. 5B is a schematic diagram illustrating a circuit structure of the optical blocked pixels in FIG. 1 in another embodiment of the disclosure.

In embodiments shown in FIG. 5A, the optical shielding component BLKa is disposed to cover the region above the second photodevice PD2, and the disclosure is not limited thereto. In some other embodiments, the optical shielding component can cover more area in the optical blocked pixel 140 to ensure that the optical blocked pixel 140 is not affected by the illumination factor. Reference is further made to FIG. 5B. FIG. 5B is a schematic diagram illustrating a circuit structure of the optical blocked pixels 140 in FIG. 1 in another embodiment of the disclosure. As shown in FIG. 5B, the optical blocked pixel 140 in some embodiments includes an optical shielding component BLKb, which covers a region above the second photodevice PD2, the first transistor T1, the second transistor T2, the third transistor T3 and the capacitor C1. In this case, the illumination factor will not affect behaviors of the second photodevice PD2, the first transistor T1, the second transistor T2, the third transistor T3 and the capacitor C1.

Figure 5C:
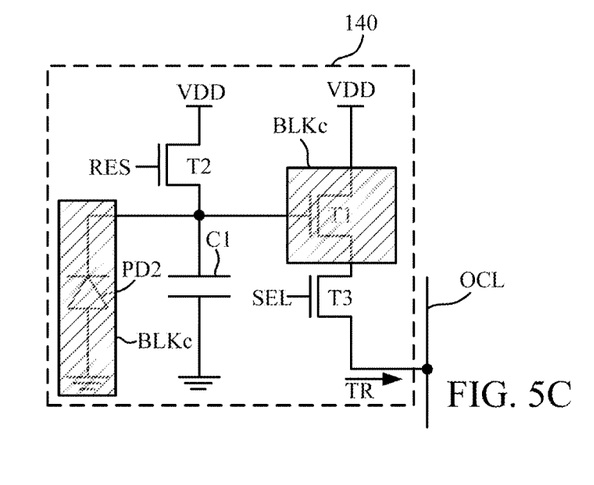
FIG. 5C is a schematic diagram illustrating a circuit structure of the optical blocked pixels in FIG. 1 in another embodiment of the disclosure.

Reference is further made to FIG. 5C. FIG. 5C is a schematic diagram illustrating a circuit structure of the optical blocked pixels 140 in FIG. 1 in another embodiment of the disclosure. As shown in FIG. 5C, the optical blocked pixel 140 in some embodiments includes an optical shielding component BLKc, which covers a region above the second photodevice PD2 and the first transistor T1. In this case, the illumination factor will not affect behaviors of the second photodevice PD2 and the first transistor T1.

In aforesaid embodiments shown in FIG. 5A to FIG. 5C, the optical blocked pixel 140 is implemented with 3T1C structure for demonstration. However, the disclosure is not limited thereto. In some embodiments, the optical blocked pixel 140 can be implemented with 4T1C structure similar to the optical sensing pixels 120 shown in FIG. 4B in combination with an optical shielding component, or other equivalent optical sensing structure in combination with an optical shielding component.

Figure 6:
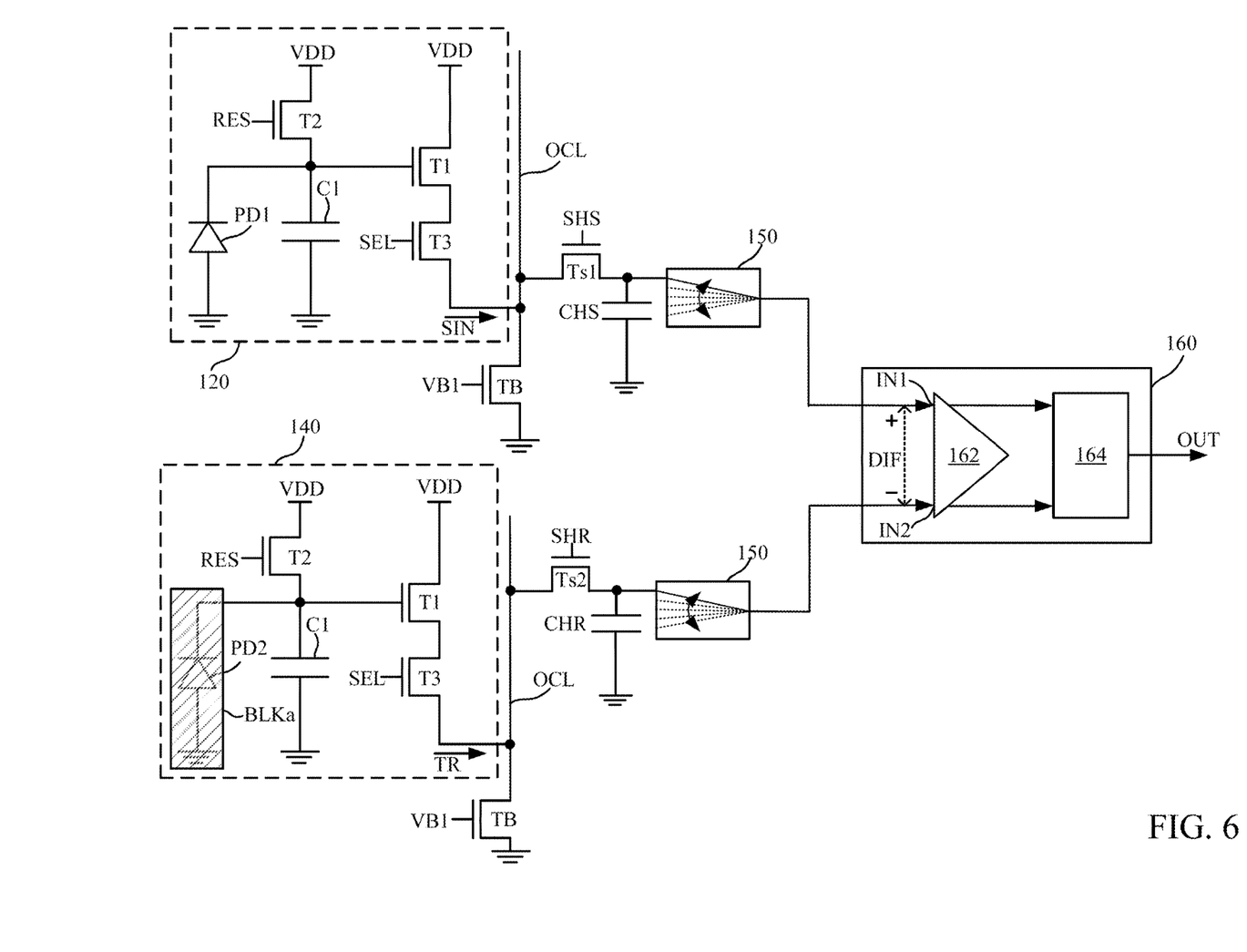
FIG. 6 is a schematic diagram illustrating a relationship between one of the optical sensing pixels, one of the optical blocked pixels and the readout circuit according to some embodiments of the disclosure.

Reference is further made to FIG. 6, which is a schematic diagram illustrating a relationship between one of the optical sensing pixels 120, one of the optical blocked pixels 140 and the readout circuit 160 according to some embodiments of the disclosure. As shown in FIG. 6, the optical sensing pixel 120 is able to generate the sensing signal SIN to the first input terminal IN1 of the differential amplifier 162, and the optical blocked pixel 140 is able to generate the tracking signal TR to the second input terminal IN2 of the differential amplifier 162. The differential amplifier 162 receives the sensing signal SIN and the tracking signal TR and is configured to amplify a difference DIF between the sensing signal SIN and the tracking signal TR.

As mentioned above, the sensing signal SIN represents the optical sensing factor about the illumination ILL (referring to FIG. 2A) and the environmental factor about the environmental condition, and the tracking signal TR represents the environmental factor. The output of the differential amplifier 162 can be:

$$\begin{aligned}\text{Output of }162 &= \text{GAIN} * (\text{SIN} - \text{TR}) \\ &= \text{GAIN} * [(\text{optical sensing factor} + \text{environmental factor}) - \\ &\quad (\text{environmental factor})] \\ &= \text{GAIN} * (\text{optical sensing factor})\end{aligned}$$

GAIN is an amplifier gain parameter of the differential amplifier 162. In other words, the tracking signal TR can be utilized to compensate or reduce the environmental factor existed in the sensing signal SIN. The output signal of the differential amplifier 162 is not related to the environmental factor. The analog-to-digital converter 164 is configured to convert the output of the differential amplifier 162 into the output signal OUT in a digital format.

As shown in FIG. 1 and FIG. 6, one optical sensing pixel 120 is able to generate one sensing signal SIN, and this sensing signal SIN will be processed into one output signal OUT by the differential amplifier 162 in reference with one tracking signal TR generated by one optical blocked pixel 140 around this optical sensing pixel 120. The output signals OUT corresponding to each of the optical sensing pixels 120 can be collected together to determine a fingerprint. For example, the output signals OUT can be processed by a processor (e.g., CPU, GPU, ASIC, not shown in figures) with a fingerprint recognition algorithm for sensing the fingerprint. It is noticed that the output signals OUT generated by the optical fingerprint sensing device 100 are not affected by the environmental factor (e.g., temperature variation), such that the optical fingerprint sensing device 100 can detect the fingerprint with higher preciseness and can be utilized in various environmental conditions.

Figure 7A:
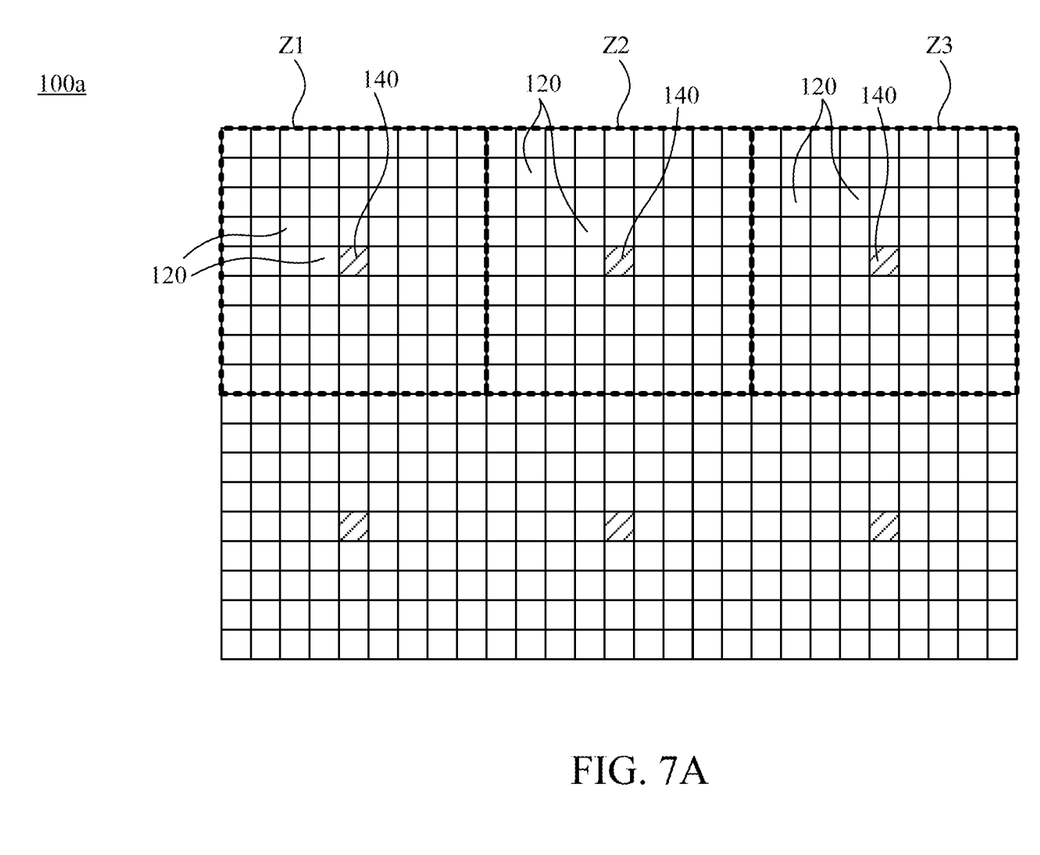
FIG. 7A to FIG. 7D are schematic diagrams illustrating different distributions of the optical sensing pixels and the optical blocked pixels in some embodiments of the disclosure.

Reference is further made to FIG. 7A, which is a schematic diagram illustrating a distribution of the optical sensing pixels 120 and the optical blocked pixels 140 in some embodiments of the disclosure. As shown in FIG. 7A, the optical fingerprint sensing device 100a includes optical sensing pixels 120 and the optical blocked pixels 140, which are distributed on a plane, which can be a top surface of a touch display panel, a touch pad or a fingerprint sensor.

As shown in FIG. 7A, the plane includes some block regions, such as block regions Z1, Z2 and Z3. The optical blocked pixels 140 can be arranged at centers of the block regions Z1, Z2 and Z3. The optical sensing pixels 120 are arranged around the optical blocked pixels. As shown in FIG. 7A, in the block region Z1, there are one optical blocked pixel 140 located at the center of the block region Z1 and eighty optical sensing pixels 120 surrounding to the optical blocked pixel 140. In embodiments shown in FIG. 7A, each of the block regions include an area of 9×9 pixels, but the disclosure is not limited thereto. In some other embodiments, each of the block regions include an area of 3×3 pixels, 5×5 pixels, 7×7 pixels or other combinations. In this case, the tracking signal TR generated by one optical blocked pixel 140 is shared by all of the optical sensing pixels 120 in the same block regions.

Figure 7B:
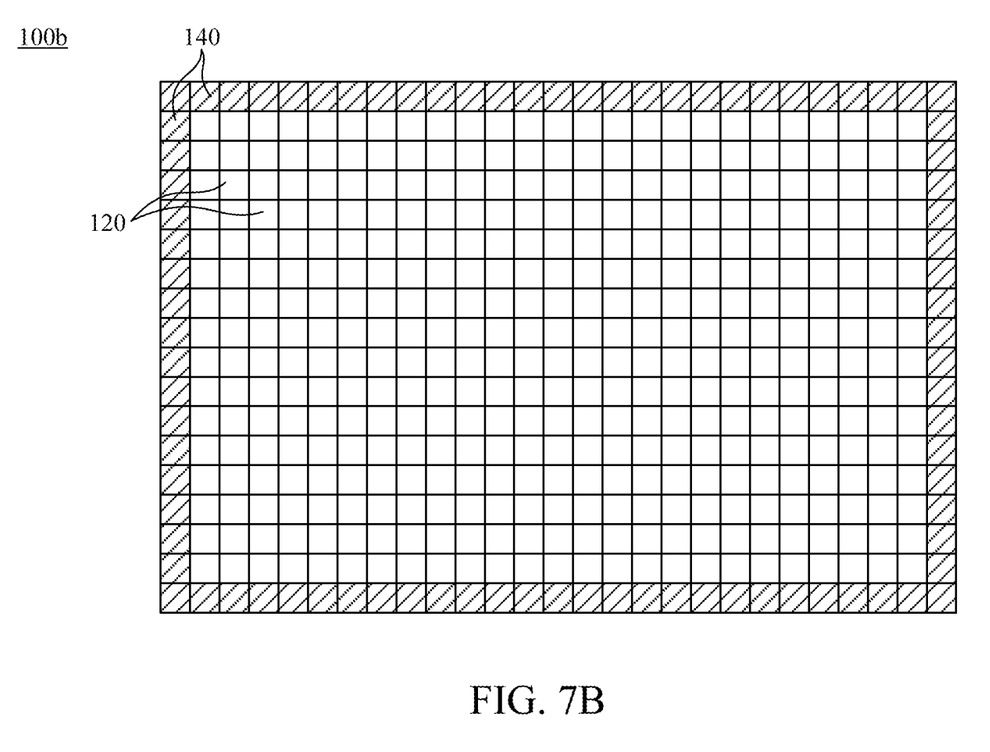

Reference is further made to FIG. 7B, which is a schematic diagram illustrating a distribution of the optical sensing pixels 120 and the optical blocked pixels 140 in some embodiments of the disclosure. As shown in FIG. 7B, the optical fingerprint sensing device 100b includes optical sensing pixels 120 and the optical blocked pixels 140, which are distributed on a plane, which can be a top surface of a touch display panel, a touch pad or a fingerprint sensor.

As shown in FIG. 7B, the optical blocked pixels 140 in the optical fingerprint sensing device 100b are arranged around borders of the plane. The optical sensing pixels 120 in the optical fingerprint sensing device 100b are arranged at an inner region of the plane.

Figure 7C:
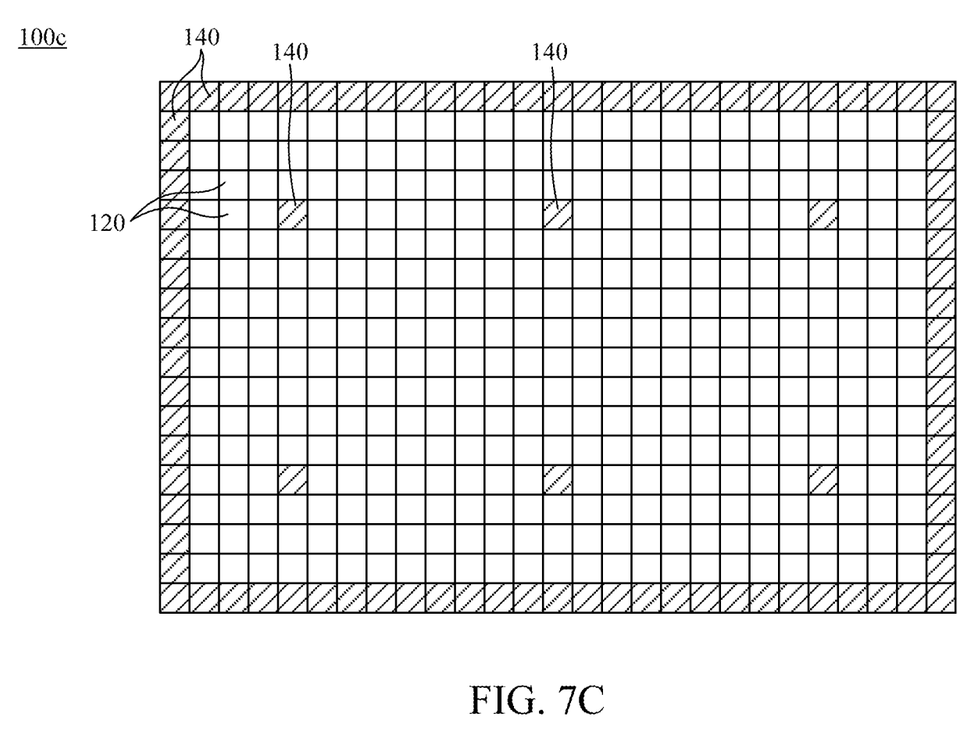

Reference is further made to FIG. 7C, which is a schematic diagram illustrating a distribution of the optical sensing pixels 120 and the optical blocked pixels 140 in some embodiments of the disclosure. As shown in FIG. 7C, the optical fingerprint sensing device 100c includes optical sensing pixels 120 and the optical blocked pixels 140, which are distributed on a plane, which can be a top surface of a touch display panel, a touch pad or a fingerprint sensor.

As shown in FIG. 7C, the optical blocked pixels 140 in the optical fingerprint sensing device 100c are arranged around borders of the plane and also located at centers of the block regions (referring to Z1, Z2 and Z3 in FIG. 7A). The optical sensing pixels 120 in the optical fingerprint sensing device 100c are arranged at an inner region of the plane.

Figure 7D:
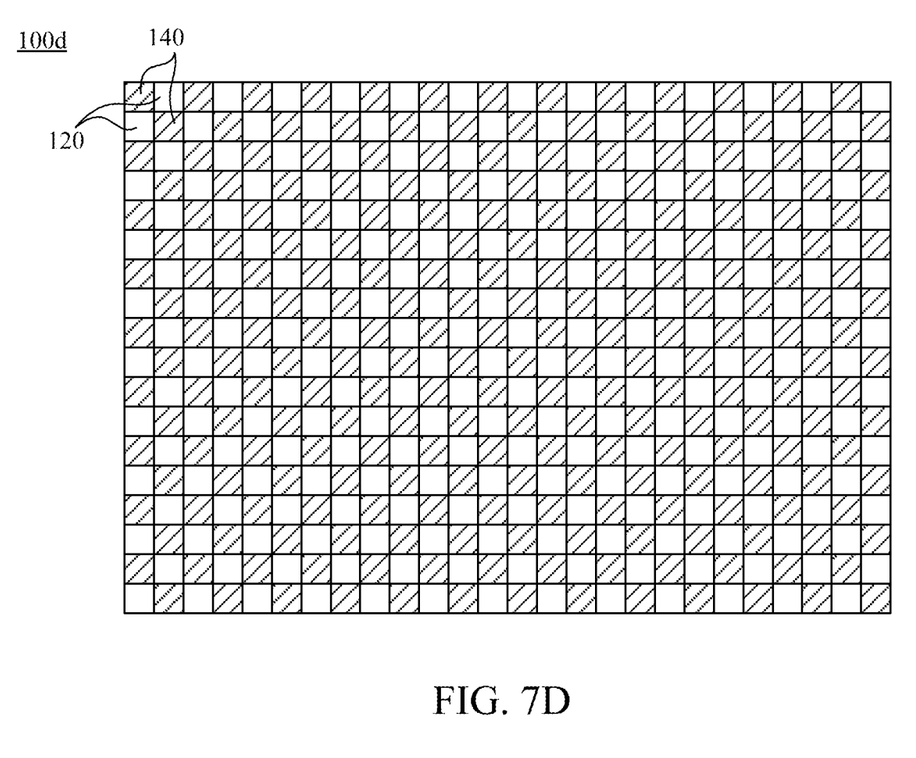

Reference is further made to FIG. 7D, which is a schematic diagram illustrating a distribution of the optical sensing pixels 120 and the optical blocked pixels 140 in some embodiments of the disclosure. As shown in FIG. 7D, the optical fingerprint sensing device 100d includes optical sensing pixels 120 and the optical blocked pixels 140, which are distributed on a plane, which can be a top surface of a touch display panel, a touch pad or a fingerprint sensor.

As shown in FIG. 7D, the optical blocked pixels 140 in the optical fingerprint sensing device 100d and the optical sensing pixels 120 in the optical fingerprint sensing device 100d are arranged in a staggered way. As shown in FIG. 7D, each of the optical blocked pixels 140 is located between two of the optical sensing pixels 120 in a vertical direction. In addition, each of the optical blocked pixels 140 is located between two of the optical sensing pixels 120 in a horizontal direction. In this case, an amount of the optical sensing pixels 120 will be the same as an amount of the optical blocked pixels 140. Adjacent two pixels (including one optical sensing pixel 120 and one optical blocked pixel 140) can be paired up to sense the output signal OUT, such that it is more efficiency to cancel the temperature variation.

Figure 8:
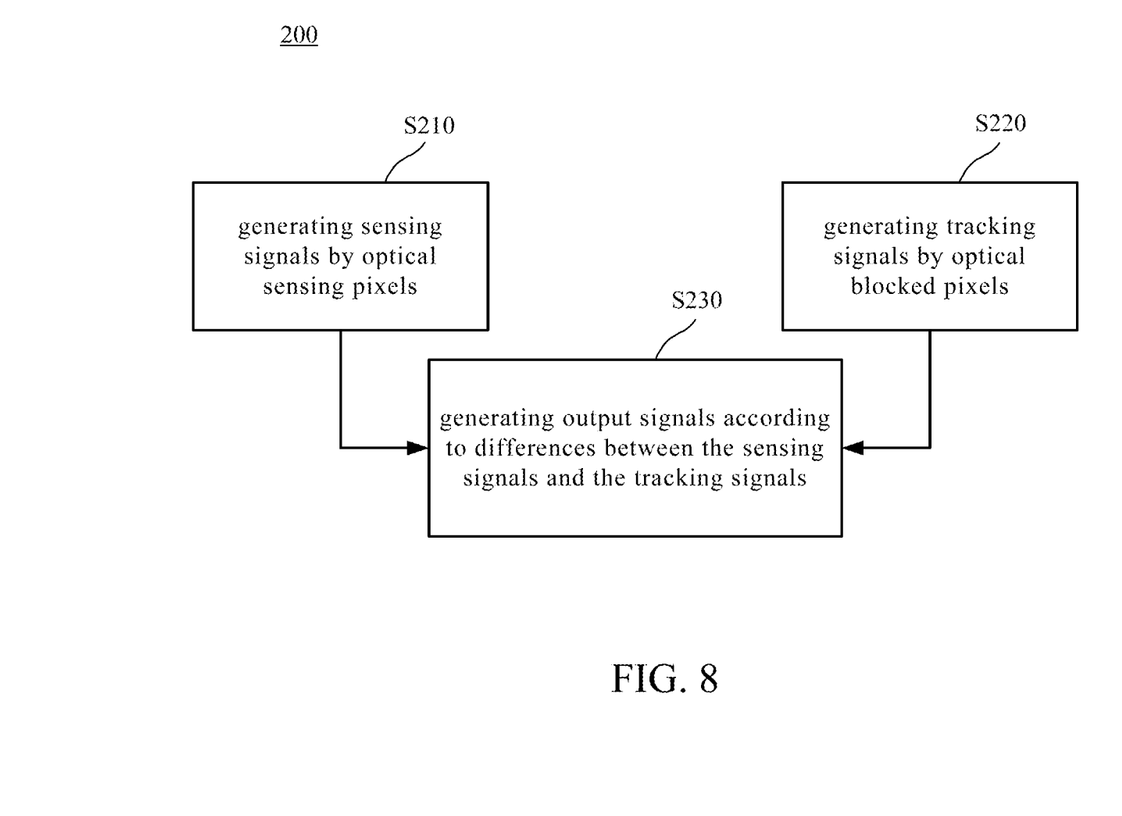
FIG. 8 is a flow chart diagram illustrating an optical fingerprint sensing method according to some embodiments of the disclosure.

Reference is further made to FIG. 8, which is a flow chart diagram illustrating an optical fingerprint sensing method 200 according to some embodiments of the disclosure. The optical fingerprint sensing method 200 can be executed by the optical fingerprint sensing devices 100, 100a-100d discussed in aforesaid embodiments along with FIG. 1 to FIG. 7D.

As shown in FIG. 1 and FIG. 8, step S210 is executed to generate sensing signals SIN by optical sensing pixels 120. Each of the optical sensing pixels 120 includes a first photodevice for sensing an illumination through an optical path. Step S220 is executed to generate tracking signals TR by optical blocked pixels 140. Each of the optical blocked pixels 140 includes a second photodevice blocked from the illumination. Step S230 is executed to generate output signals OUT according to differences DIF between the sensing signals SIN and the tracking signals TR by a differential amplifier 162.

Further details and functions about the optical sensing pixels 120, the optical blocked pixels 140 and the differential amplifier 162 can be referred to aforesaid embodiments along with FIG. 1 to FIG. 6, and not to be repeated here again.

It is noticed that the output signals OUT generated by the optical fingerprint sensing method 200 are not affected by the environmental factor (e.g., temperature variation) because the tracking signals TR is able to compensate the environmental factor existed in the sensing signals SIN, such that the optical fingerprint sensing method 200 can detect the fingerprint with higher preciseness and can be utilized in various environmental conditions.

The foregoing has outlined features of several embodiments so that those skilled in the art may better understand the detailed description above. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An optical fingerprint sensing device, comprising:
   a plurality of optical sensing pixels, each of the optical sensing pixels comprises a first photodevice for sensing an illumination through an optical path, the optical sensing pixels are configured to generate a plurality of sensing signals, wherein each of the optical sensing pixels further comprises an optical shielding component, the illumination passes through at least one opening on the optical shielding component to the first photodevice, wherein the optical shielding component comprises:
      a color filter layer, disposed above the first photodevice, wherein a first opening is formed on the color filter layer along the optical path; and
      a shading layer, disposed above the first photodevice, wherein a second opening is formed on the shading layer along the optical path, and the illumination passes through the first opening and the second opening to the first photodevice;
   a plurality of optical blocked pixels, each of the optical blocked pixels comprises a second photodevice blocked from the illumination, the optical sensing pixels are configured to generate a plurality of tracking signals; and
   a readout circuit configured to generate output signals according to differences between the sensing signals and the tracking signals.

2. The optical fingerprint sensing device according to claim 1, wherein each of the optical blocked pixels further comprises the optical shielding component, the illumination is blocked from the second photodevice by the optical shielding component.

3. The optical fingerprint sensing device according to claim 2, wherein each of the optical blocked pixels further comprises:
   a first transistor, a gate of the first transistor being coupled with the second photodevice;
   a second transistor coupled between the gate of the first transistor and a system voltage level;
   a third transistor coupled between the first transistor and an output column line; and
   a capacitor coupled with the gate of the first transistor.

4. The optical fingerprint sensing device according to claim 3, wherein the optical shielding component is disposed to cover a region above the second photodevice.

5. The optical fingerprint sensing device according to claim 3, wherein the optical shielding component is disposed to cover a region above the second photodevice and the first transistor.

6. The optical fingerprint sensing device according to claim 3, wherein the optical shielding component is disposed to cover a region above the second photodevice, the first transistor, the second transistor, the third transistor and the capacitor.

7. The optical fingerprint sensing device according to claim 1, wherein the readout circuit comprises a differential amplifier, the differential amplifier comprises a first input terminal and a second input terminal, the first input terminal is configured to receive one of the sensing signals and the second input terminal is configured to receive one of the tracking signals.

8. The optical fingerprint sensing device according to claim 1, wherein the optical sensing pixels and the optical blocked pixels are distributed on a plane, the plane comprises a plurality of block regions, the optical blocked pixels are arranged at centers of the block regions, the optical sensing pixels are arranged around the optical blocked pixels.

9. The optical fingerprint sensing device according to claim 1, wherein the optical sensing pixels and the optical blocked pixels are distributed on a plane, the plane comprises a plurality of block regions, a first part of the optical blocked pixels is arranged at centers of the block regions, a second part of the optical blocked pixels is arranged around borders of the plane, the optical sensing pixels are arranged around the first part of the optical blocked pixels.

10. The optical fingerprint sensing device according to claim 1, wherein the optical sensing pixels and the optical blocked pixels are distributed on a plane, the optical blocked pixels are arranged around borders of the plane, the optical sensing pixels are arranged at an inner region of the plane.

11. The optical fingerprint sensing device according to claim 1, wherein the optical sensing pixels and the optical blocked pixels are distributed on a plane, the optical sensing pixels and the optical blocked pixels are arranged in a staggered way.

12. An optical fingerprint sensing method, comprising:
   generating a plurality of sensing signals by a plurality of optical sensing pixels, each of the optical sensing pixels comprises a first photodevice for sensing an illumination through an optical path;

generating a plurality of tracking signals by a plurality of optical blocked pixels, each of the optical blocked pixels comprises a second photodevice blocked from the illumination; and generating a plurality of output signals according to differences between the sensing signals and the tracking signals by a differential amplifier, wherein each of the optical sensing pixels comprises an optical shielding component, the illumination passes through at least one opening on the optical shielding component to the first photodevice, wherein the optical shielding component comprises:

a color filter layer, disposed above the first photodevice, wherein a first opening is formed on the color filter layer along the optical path; and a shading layer, disposed above the first photodevice, wherein a second opening is formed on the shading layer along the optical path, and the illumination passes through the first opening and the second opening to the first photodevice.

13. The optical fingerprint sensing method according to claim 12, wherein the sensing signals are configured to sense the illumination for detecting a fingerprint.

14. The optical fingerprint sensing method according to claim 13, wherein the output signals are compensated based on the tracking signals.

15. The optical fingerprint sensing method according to claim 12, wherein the optical sensing pixels and the optical blocked pixels are distributed on a plane, the plane comprises a plurality of block regions, the optical blocked pixels are arranged at centers of the block regions, the optical sensing pixels are arranged around the optical blocked pixels.

16. The optical fingerprint sensing method according to claim 12, wherein the optical sensing pixels and the optical blocked pixels are distributed on a plane, the plane comprises a plurality of block regions, a first part of the optical blocked pixels is arranged at centers of the block regions, a second part of the optical blocked pixels is arranged around borders of the plane, the optical sensing pixels are arranged around the first part of the optical blocked pixels.

17. The optical fingerprint sensing method according to claim 12, wherein the optical sensing pixels and the optical blocked pixels are distributed on a plane, the optical blocked pixels are arranged around borders of the plane, the optical sensing pixels are arranged at an inner region of the plane.

18. The optical fingerprint sensing method according to claim 12, wherein the optical sensing pixels and the optical blocked pixels are distributed on a plane, the optical sensing pixels and the optical blocked pixels are arranged in a staggered way.

* * * * *